United States Patent [19]

Ongaro

[11] Patent Number: 4,584,873
[45] Date of Patent: Apr. 29, 1986

[54] INTEGRATED TIRE CONDITIONING SYSTEM AND METHOD

[75] Inventor: Theodore Ongaro, Columbus, Ohio

[73] Assignee: Ongaro Dynamics, Ltd., Columbus, Ohio

[21] Appl. No.: 644,527

[22] Filed: Aug. 27, 1984

[51] Int. Cl.⁴ ............................................. G01M 17/02
[52] U.S. Cl. ......................................................... 73/146
[58] Field of Search .................... 73/146; 59/DIG. 33, 59/106 R

[56] References Cited

U.S. PATENT DOCUMENTS 3,206,973 9/1965 Obarski .................................. 73/146

Primary Examiner—Donald O. Woodiel
Attorney, Agent, or Firm—Frost & Jacobs

[57] ABSTRACT

Tire conditioning apparatus wherein the tire may be loaded and conditioned both in a static mode and in a dynamic mode, the apparatus including a tire mounting assembly comprising a pair of pivotally mounted upright arms rotatably mounting a drive shaft by means of which the tire is rotated at any desired speed, the tire mounting assembly having a static mode in which the arms are held in fixed position and the tire is loaded by pressing a road wheel against the tire under a predetermined fixed load, and a dynamic mode in which the upright arms are spring loaded and act to press the tire into contact with the road wheel under conditions simulating the action of the vehicle's suspension system, sensors being provided to locate and measure the forces generated by the tire in each mode and also in a third or free running mode in which the tire is free from contact with the road wheel.

14 Claims, 6 Drawing Figures

INTEGRATED TIRE CONDITIONING SYSTEM AND METHOD

This invention relates to the correction of rubber tires, and more specifically to the correction of the tires to overcome non-uniform force areas at the "foot print" of the tire, thereby eliminating scrubbing and the vibration causing forces which are generated in a tire during normal use, thus reducing torque and rolling resistance.

BACKGROUND OF THE INVENTION

The present invention constitutes an improvement over the type of tire correcting apparatus taught in U.S. Pat. Nos. 4,016,020; 4,078,339; and 4,084,350 each of which discloses a system for measuring and correcting vibration generating forces in vehicular tires. The present invention also utilizes a multiple plane road wheel of the type disclosed in U.S. Pat. No. 4,211,109 wherein the periphery of the tire being corrected is in contact with a multiple plane road wheel comprising a series of uniform diameter wheel disks provided with sensor means to sense forces generated by the rotating tire in the peripheral areas of the tire contacted by each wheel disk, thereby enabling the user to isolate and measure the forces generated by the tire throughout the full width of its tread.

A principle objective of the inventions disclosed in the aforementioned patents, all of which are in the name of the present inventor, was to simulate the conditions encountered by the tire in normal use, i.e., when driven on a highway at normal cruising speed. In order to simulate actual operating conditions, the tire is mounted on a test wheel which is driven at the desired cruising speed, which might be 50–55 miles per hour in the case of a conventional automobile tire, or at a much higher rate of speed in the case of tires which are to be used for racing cars. The weight load which will be borne by the tire under normal conditions of use is simulated by pressing the road wheel against the tire at an applied force equivalent to that portion of the weight of the vehicle which would be borne by the tire.

While the arrangement just described provides valuable information for use in correcting and conditioning the tire, it does not take into consideration the fact that the tire is flexibly mounted with respect to the vehicle through the vehicle's suspension system. As the tire is rotated in normal use, peripheral non-uniformities in the tire react against the vehicle's suspension system, which is dynamically loaded and hence reacts differently than if the tire were operating against a static load. It has been found that precise conditioning and correction of the tire requires evaluation while the tire is under a dynamic sprung load simulating the action of the vehicle's springs, as well as under static or fixed load.

SUMMARY OF THE INVENTION

In accordance with the present invention a system is provided wherein the tire may be loaded and conditioned both in a static mode and in a dynamic sprung mode, the data collected and compared, and the tire corrected based on the composite data, thereby eliminating unnecessary and expensive road testing. The system, due to the multiple mode testing and evaluation of the tire, provides far greater accuracy than was heretofore obtainable utilizing known systems.

While the present invention utilizes many of the features disclosed in the aforementioned patents, including a multiple plane road wheel, the key improvement resides in mounting the tire for selective loading in either a static or dynamic sprung mode. To this end, the tire is mounted on a drive shaft supported on opposite sides of the tire by upright arms pivotally mounted to the machine frame below the axis of rotation of the tire, the lower ends of the arms being connected together by a cross member. When operating in the static mode, the lower ends of the upright arms abut against retractable stops which, in their extended position, effectively immobilize the arms in a vertical position irrespective of the road wheel loading.

When it is desired to load the tire in the dynamic sprung mode, the stops are retracted and the upright arms come under the influence of a load spring assembly operatively connected to the upright arms by the cross member. The load spring assembly acts to load the tire through the upright arms and hence simulates the action of the vehicle's suspension system.

In accordance with the invention, the upright arms and tension springs are utilized to measure dynamic unbalance of the tire. This, in effect, is a third mode of operation wherein the stops are retracted from engagement with the upright arms, and the road wheel is retracted while neutralizing the load spring assembly, the tire being free to rotate and oscillate without fixed restraints. Imbalance and unloaded torque are measured while the system is in the third or free running mode.

In the operation of the system, a new tire to be processed is normalized or preconditioned in the static mode, i.e., with the upright arms seated against the stops and static load applied to the tire by the road wheel. During preconditioning, the tire will be loaded to more than normal load and driven at higher than normal speeds, first in one direction and then in the opposite direction, whereupon the tire will be stopped and unloaded.

The initial testing of the tire is accomplished while the tire is running at normal static load, speed, and tire pressure, the data from the various sensors being collected and stored in a computer, as taught in the aforementioned patents.

Following static testing, the upright arms will be fixed and dynamically loaded by means of the load spring assembly, and while still running at normal speed the tire will be tested and data reflecting tire performance in the dynamic mode, including torque, collected and stored.

While still running at normal speed, the tire will be completely unloaded while maintaining the upright arms in vertical position, i.e., in the third or free running mode of operation, whereupon imbalance and unloaded torque will be measured and the collected data stored.

Preferably, the three-stage testing procedure just described will be repeated with the tire rotating in the opposite direction. Following testing, the computer will be utilized to compare the data and determine the corrective steps to be taken, whereupon the tire will be subjected to corrective honing under either direct computer control or indirect operator control.

While previous systems have relied solely on static loading of the tire during testing and correction, the present system enables measurements to be taken in both the static and dynamic modes, the data compared and correlated, and the tire corrected to achieve optimum performance.

DESCRIPTION OF THE PREFERRED EMBODIMENT

Figure 1:
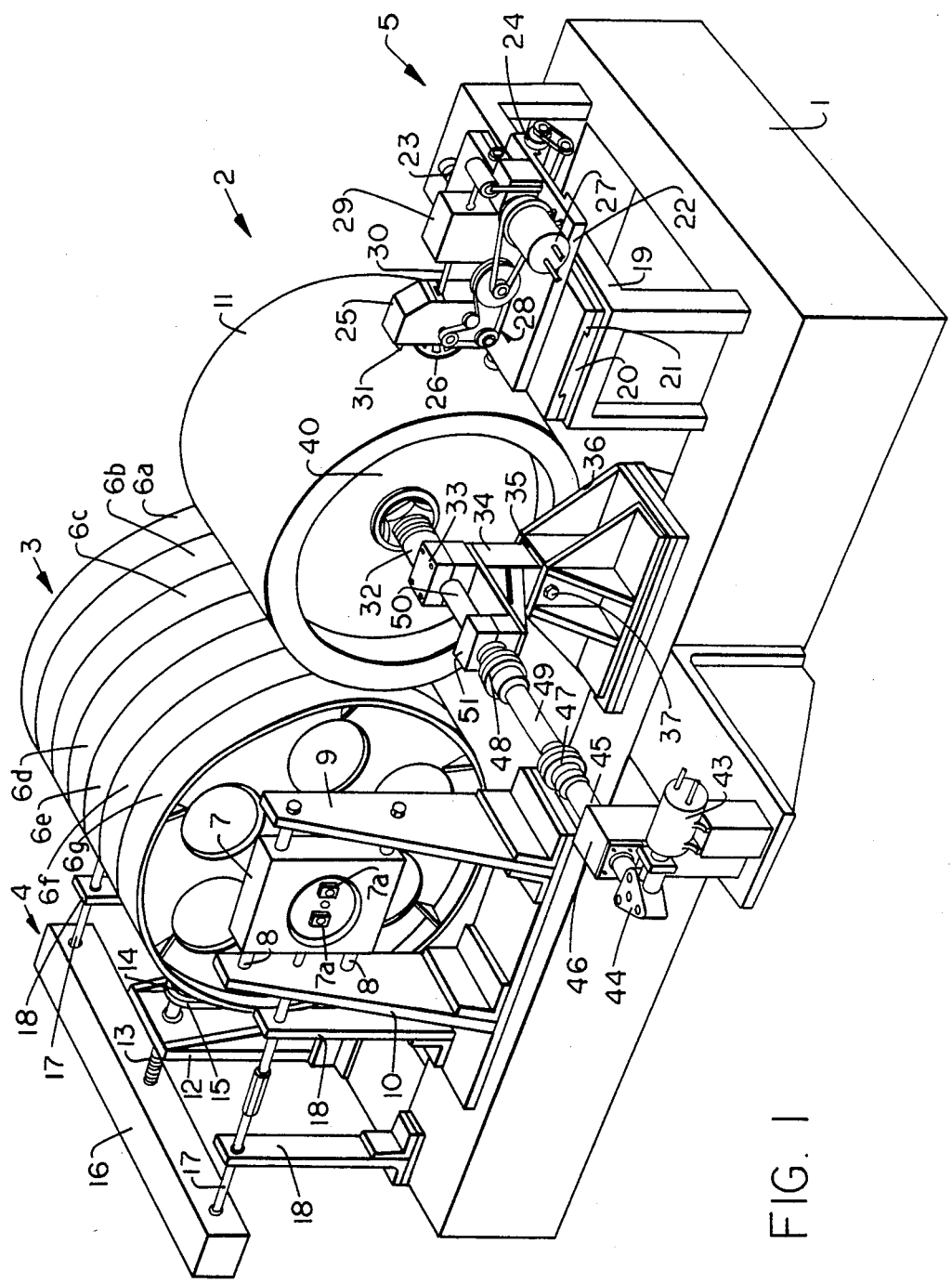
FIG. 1 is a perspective view of the tire conditioning system.

Referring first to FIG. 1, which illustrates the complete system, the main frame consists of a rigid rectangular base 1 on which the various operating components are mounted, the basic components comprising a tire mounting assembly 2, a multiple plane road wheel assembly 3, a loading assembly 4 for the road wheel, and a tire honing assembly 5.

The multiple plane road wheel assembly 3 is of the type taught in U.S. Pat. No. 4,211,109, and reference is made to this patent for details of its construction. Basically, the road wheel assembly comprises a plurality of wheel disks 6a–6g supported by quills at the opposite ends of the road wheel, one of which is indicated at 7, the quills being slidably mounted on one or more support rods 8 extending between and secured to vertical posts 9 and 10 mounted on the rigid base 1. With this arrangement, the tire 11 which, in the illustrated embodiment is a racing tire, can be statically loaded by displacing the road wheel assembly 3 toward the tire. The road wheel is displaced by means of the loading assembly 4 which comprises a central vertical support 12 mounting a drive screw 13 adapted to be rotated by the sprocket 14 and chain 15, the latter being driven by a reversible stepping motor or other reversible drive means (not shown). The drive screw 13 is in threaded engagement with a transfer bar 16 which loads the road wheel through rods 17 which engage the road wheel supporting quills, such as the quill 7, the rods 17 being supported by posts 18.

As described in detail in the aforementioned U.S. Pat. No. 4,221,109, each of the wheel disks 6a–6g is provided with sensor means positioned to sense forces generated by the rotating tire and transmitted to the wheel disks by the peripheral areas of the tire contacted by each disk at the "foot print". A first set of sensors detects and measures force variations created by the rotating tire in the plane of each wheel disk, and a second set of sensors detects variations in the speed of rotation of the wheel disks relative to each other, which is indicative of irregularities in the periphery of the tire. In addition, sensing elements 7a, seen in FIG. 1, are provided to detect and measure the magnitude and direction of the lateral and tangential force components generated by the tire.

The tire honing assembly 5 is also of essentially conventional character, being of the type taught in the aforementioned U.S. Pat. Nos. 4,078,339 and 4,084,350. Basically, the honing assembly comprises a platform 19 secured to the rigid base 1, the platform mounting a stationary male dovetail base plate 20 which slidably mounts a female dovetail base plate 21, the upper surface of which forms a male guide for a second female dovetail plate 22 movable at right angles to the plate 21. Relative movement between the plates 20 and 21 is obtained by means of a stepping motor 23, and a stepping motor 24 effects relative movement between the plates 21 and 22.

Plate 22 mounts an open ended housing 25 in which a honing wheel 26 is rotatably mounted, the honing wheel projecting outwardly from the housing in the direction of the tire 11. The honing wheel is driven by electric or hydraulic motor 27 through a gear belt assembly 28. The housing 25 is either pivotally or slidably mounted for movement relative to the plate 22 so that the honing wheel may be rapidly advanced and retracted by means of a single-ended double-acting hydraulic power unit 29 having a piston rod 30 which engages the housing 25. The hydraulic power unit 29 may be of the type taught in U.S. Pat. No. 4,096,784, which is operable in a cyclic order at a rate of over 500 Hz. The honing assembly is also provided with a gauging sensor 31 which measures and supplies to the computer controlling the operation of the honer the distance in 1000ths of an inch increments between the front face of the sensor and the greatest centrifically developed peripheral tire area; and the computer in turn controls the stepping motor 24 to position the honing wheel a preset distance from the highest area of the tire. With this arrangment, the honing wheel will always clear the highest point on the periphery of the tire prior to the actual honing operation. In addition, the gauging sensor 31 provides a run-out measurement of the total configuration of the periphery of the tire as it rotates.

In operation, the honer may be moved laterally relative to the tire to align it with the area to be honed. Actual honing is under the control of the hydraulic power unit 29 which advances and retracts the honing wheel 26 at the precise circumferential locations, which may be as small as 20°, where rubber is to be removed from the tire. While a single honing device is illustrated, it will be understood that a plurality of honing devices may be utilized.

Figure 2:
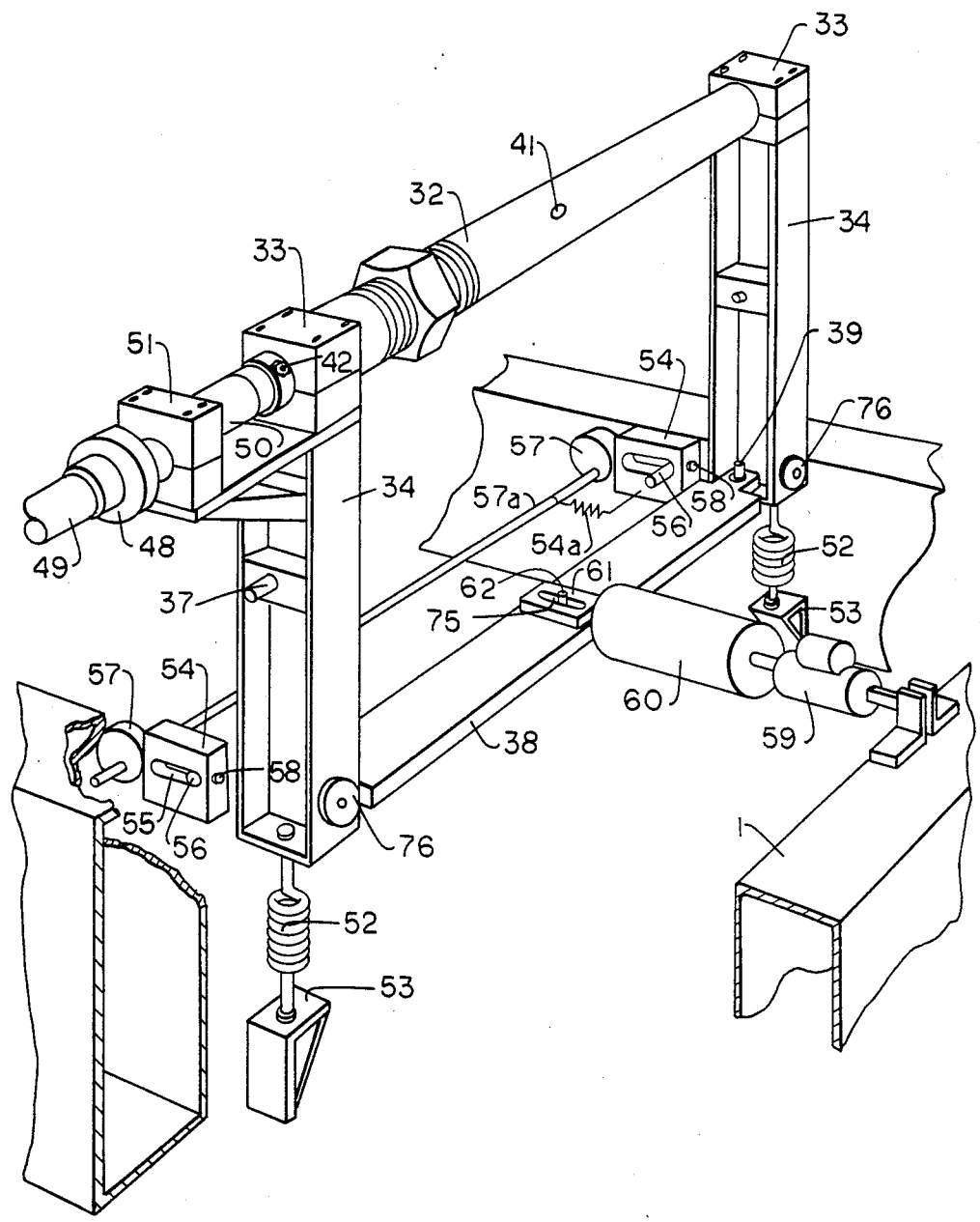
FIG. 2 is a fragmentary perspective view with parts broken away showing details of the tire mounting assembly.

Referring now to the tire mounting assembly 2, the tire 11 is mounted on a drive shaft 32 supported on opposite sides of the tire by bearing blocks 33 mounted on the upper ends of the upright arms 34 which extend downwardly through annular openings 35 in support members 36 mounted on the base 1, the upright arms being pivotally mounted to the supports 36 by means of king pins 37, seen in FIG. 2, which engage supports 36. At their lowermost ends, the upright arms 34 are interconnected by a cross member 38 the opposite ends of which are secured to the upright arms by self-aligning ball bushings 39.

The drive shaft 32 mounts a pair of opposed wheel-halves 40 which mount the tire in the same manner as if the tire were mounted on a conventional wheel. The drive shaft 32 is hollow and provided intermediate the wheel halves with one or more ports 41 by means of which the tire 11 may be inflated, the shaft 32 having a tire inflation coupler 42 lying outwardly beyond one of the shaft bearings 33. The drive shaft also may be constructed to accommodate standard tire and rim assemblies.

The shaft 32 is adapted to be driven by an hydraulic or electric motor 43 which drives the shaft through transfer gear 44 and stub shaft 45 which extends through a bearing block 46. The bearing block 46 preferably will incorporate an encoder and a torque sensor, such as S. Himmelstein, of known character which measures speed of rotation and torque. The stub shaft 45 is connected to the drive shaft 32 by means of flexible couplings 47 and 48 interconnected by shaft 49. The coupling 48 is connected to a coupling shaft 50 supported in support bearing 51, the coupling shaft 50 being detachably connected to the drive shaft 32 so that the drive shaft may be disconnected and removed from the drive train.

The pivotally mounted upright arms 34 are engaged at their lowermost ends by tension springs 52, seen in FIG. 2, attached to mounting brackets 53 secured to the base 1, the springs 52 being arranged in axial alignment with the upright arms 34 so as to normally maintain the upright arms 34 in vertical position. Precise vertical alignment of the upright arms 34 is achieved by means of movable spring loaded stops 54 positioned to contact the lower sides of the arms facing the multiple plane road wheel assembly 3. Each of the stops 54 has a horizontally disposed slot 55 therein which slidably receives a stop pin 56 afixed to the machine frame. The stops are displaced toward and away from the upright arms by means of stop positioning cams 57 which, upon rotation, will urge the spring loaded stops 54 toward the upright arms. The extended position of the stops 54 is established by the cam rise, which insures that the upright arms 34 are in true vertical position. Stops 54 may be spring loaded in various ways, as by means of coil springs 54a extending between the stops 54 and cam actuating shaft 57a. Each stop 54 mounts a force sensor 58 on its front face which contacts the adjoining upright arm 34 when the stop is in its extended position.

The positioning of the upright arms 34 is controlled by a positioning control system comprising an actuator 59 connected at one end to the machine frame 1 and at its opposite end to a compression load spring assembly 60 which, in turn, is connected to the center of the cross member 38 by a slotted connecting yoke 61 which engages a pin 62 mounted on the cross member 38.

Figure 3:
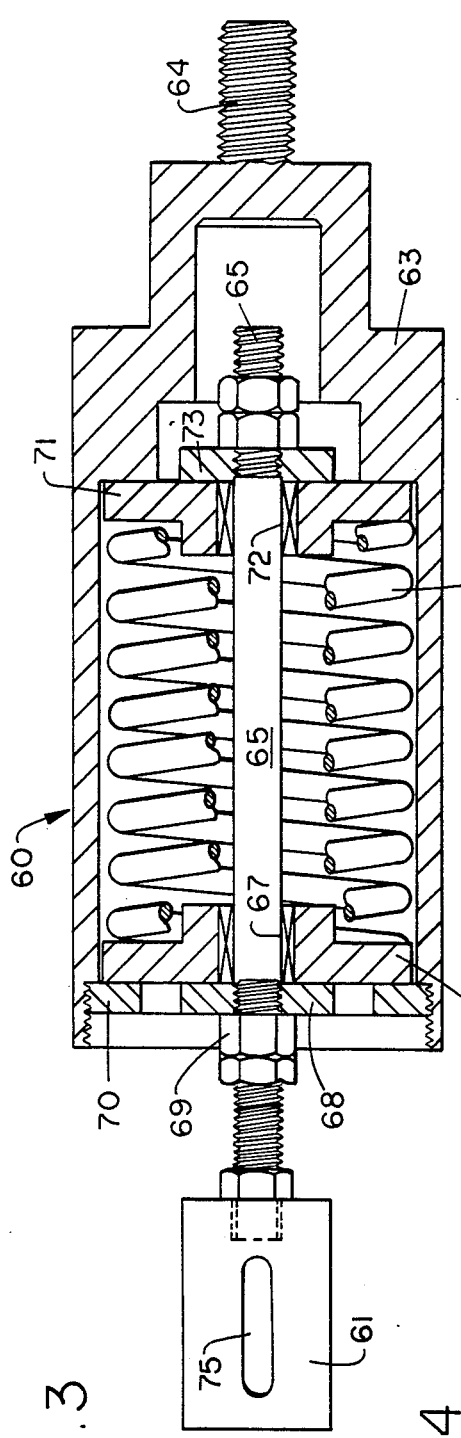
FIG. 3 is an enlarged horizontal sectional view of the compression load assembly.

As seen in FIG. 3, the compression load spring assembly 60 comprises a spring housing 63 having a threaded fitting 64 at one end by means of which the housing is connected to the actuator 59, which may comprise a Duff/Norton electric actuator of known construction. A center shaft 65 is journaled in housing 63. At one end the shaft 65 is journaled in a spring compression flange 66 by means of a sleeve bearing 67, the compression flange 66 abutting against a washer 68 surrounding the shaft 65, the position of the washer 68 on the shaft 65 being adjusted by means of adjustment nuts 69 threaded on the shaft 65. The compression flange 66 is maintained within the spring housing 63 by means of a housing cover 70 in threaded engagement with the open end of the housing. An opposing spring compression flange 71 is journaled on shaft 65 by sleeve bearing 72 and abuts against washer 73, the flange 71 being seated against the adjacent end of the housing 63. A helical load spring 74 surrounds the shaft 65 and abuts at its opposite ends against the spring compression flanges 66 and 71, respectively. The entire load spring assembly 60 is adapted to be compressed axially in both directions by means of the actuator 59.

The load spring assembly 60 is adapted to perform three functions. The first function is to positively arrest movement of the upright arms 34 by locking them against the stops 54 during operations which require the axis of drive shaft 32 to be immobile. Immobilization of the upright arms 34 against the stops 54 results from the displacement of the load spring assembly 60 toward the cross member 38 so that the inner end of the slot 75 in connecting yoke 61 engages pin 62, thereby positively urging the cross bar 38 and the upright arms 34 against the stops 54. In this mode the load spring 74 is compressed and the closed end of the housing 63 bears directly against the spring compression flange 71 which slides on the shaft 65. The load spring assembly assumes this position when the tire is in the static loaded mode, i.e., when the tire 11 is loaded by displacement of the multiple plane road wheel 3 in the direction of the tire.

When it is desired to dynamically load the tire, the spring loaded stops 54 are retracted so that the upright arms 34 are free to pivot about king pins 37 allowing the road wheel actuator to move the road wheel assembly in synchronization with actuator 59 to maintain upright arms 34 in a vertical position with a loaded force ranging from 500 to 1500 pounds. Actuator 59 pulls on the housing 63 which in turn pulls the spring compression flange 66 away from housing cover 70, thereby displacing the compression flange 66 toward the opposing compression flange 71, such movement acting to compress load spring 74, thereby dynamically spring loading the tire 11 by urging it toward the road wheel 3 at a desired load.

When the tire is dynamically loaded, motion sensors 76 mounted on the upright arms 34 facing the load spring assembly 60 measure displacement of the upright arms caused by centrifically generated nonuniformities in the periphery of the tire as experienced in actual use.

In the operating of the system, the tire to be conditioned is mounted on the wheel halves 40, centered, and the shaft 32 fitted into the shaft bearings 33 followed by the coupling of the drive shaft 32 to the drive train by means of coupling shaft 50. The tire will be inflated by means of the ports 41 and inflation coupling 42.

Figure 4:
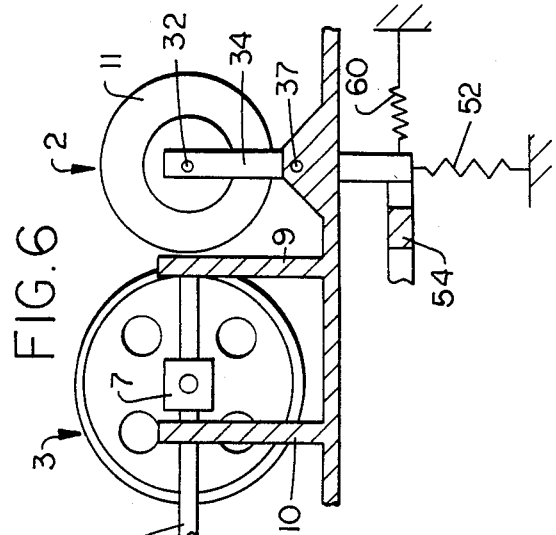
FIG. 4 is a diagrammatic side elevational view illustrating the tire mounting and road wheel assemblies in the first or static mode of operation.

The tire is then statically loaded to the condition diagrammatically illustrated in FIG. 4, wherein the stops 54 are extended so as to maintain the upright arms 34 in vertical position, whereupon the road wheel 3 is urged into contact with the tire 11, the applied force acting to statically load the tire. Initially, the tire is preconditioned or normalized by being loaded to greater than normal load and driven at higher than normal speed, first in one direction and then in the other direction.

Following preconditioning, the tire will be stopped and unloaded, whereupon it will again be loaded while being accelerated to normal operating speed. The force signals generated by each road wheel disk 6a-6g will be integrated during loading and acceleration to establish the static load as measured by each road wheel disk, and the sensors 7a in the quills 7 of the road wheel assembly will determine overall loading. With the tire running at normal speed, load and tire pressure, data will be collected and recorded by the various sensors associated with the tire mounting assembly 2 and the road wheel assembly 3, as well as by the run out sensor 31 associated with the honing assembly 5 the carriage of which will be actuated to collect run out profile data.

Figure 5:
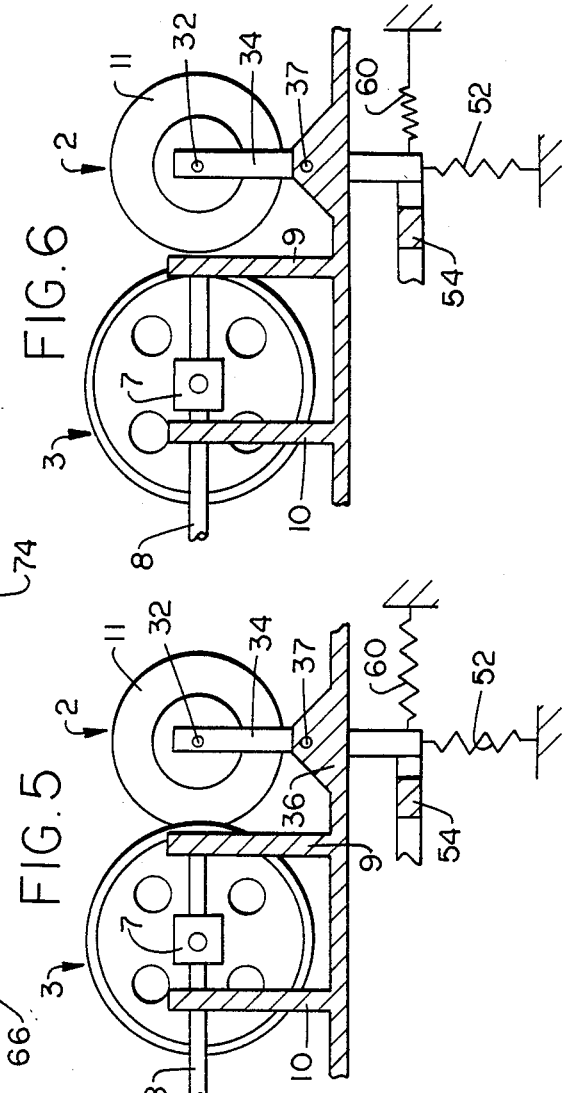
FIG. 5 is a diagrammatic side elevational view similar to FIG. 4 but with the assemblies in the dynamic mode of operation.

Following evaluation in the static mode, the tire will be dynamically loaded to the condition illustrated in FIG. 5 by retracting the stops 54 and actuating the actuator 59 to spring load the tire through load spring assembly 60, thereby simulating the spring loaded condition of the tire in actual use. All previous data collection will be repeated, excepting for run out, while the tire is dynamically loaded.

Figure 6:
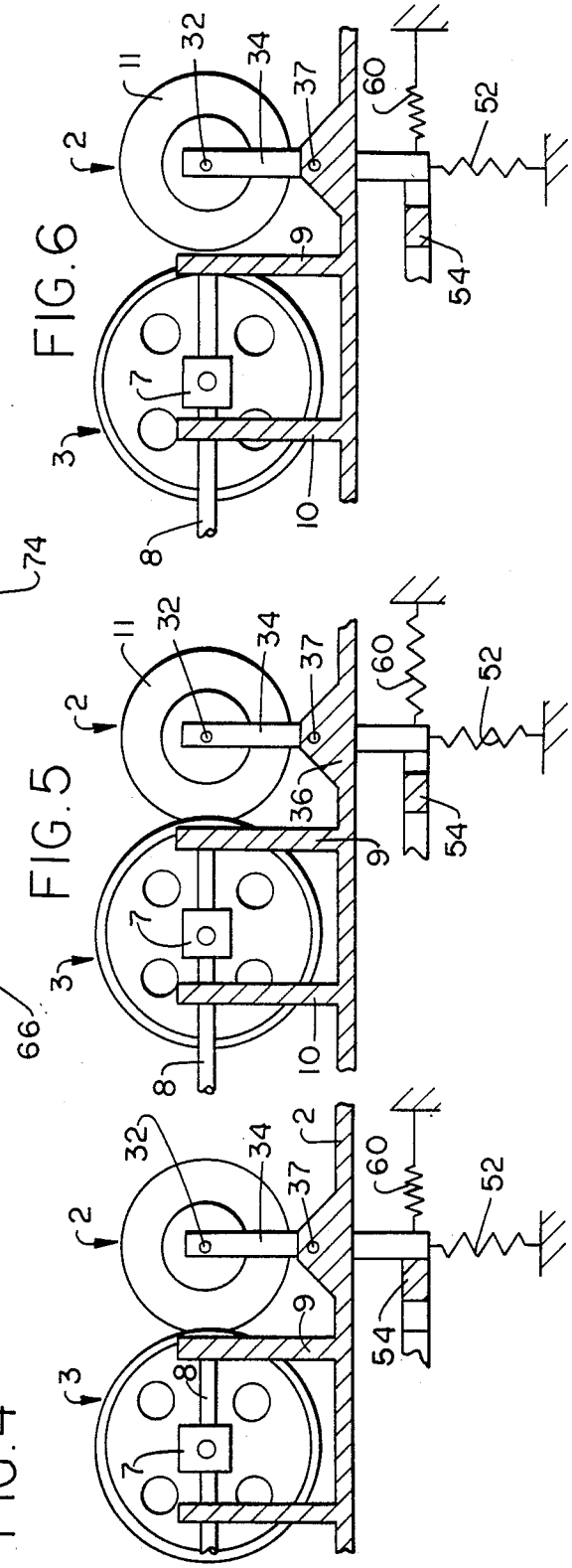
FIG. 6 is a diagrammatic side elevational view similar to FIGS. 4 and 5 but with the assemblies in the third or free running mode of operation.

Following evaluation in the dynamic mode and while still running at normal speed, the tire will be completely unloaded by returning the load spring assembly 60 to unloaded condition in a neutral state and removing the road wheel from contact with the tire. With stops 54 in a retracted state, upright arms 34 are centralized by tension springs 52, the system thus assuming the condition illustrated in FIG. 6 in which the tire is freely rotatable in space. Dynamic imbalance is measured while the tire is in free running mode, as is unloaded torque.

Following measurement for imbalance, the entire data collection procedure preferably will be repeated with the tire rotating in the opposite direction. When all of the data has been collected, it will be processed by the computer to extract the tire signals from system noise. Optionally, the corrected signals may be individually plotted, combined in a topographic plot, and/or plotted against each other or against operator selected parameters. Forward and reverse behavior, force run out, and other data may be compared and analyzed to determine the location and magnitude of the corrections which are to be made.

The honing of the tire will then take place, the tire being honed while in the static loaded mode, i.e., with the tire mounting assembly 2 and road wheel 3 in the condition illustrated in FIG. 4. After all corrections have been made, the tire is marked with information indicating the direction of rotation which will give the lowest possible rolling resistance.

As should now be evident, the present invention adds additional dimensions in the correcting of vehicular tires by providing the user with information concerning the forces generated by the rotating tire when subjected to dynamic loading with a spring loaded system, thereby implementing the correction of the tire to achieve optimum performance in use.

What is claimed is:

1. In tire correcting apparatus wherein the tire is placed in contact with a road wheel to simulate the load borne by the tire in normal use, a tire mounting assembly comprising:
    a pair of spaced apart upright arms pivotally mounted on supports intermediate their opposite ends,
    a drive shaft rotatably journalled to the upper ends of said upright arms,
    means for rotating said drive shaft,
    means for mounting a tire on said drive shaft intermediate said upright arms,
    resilient load applying means operatively connected to the lowermost ends of said upright arms, said load applying means being movable from an unloaded position to a loaded position, and
    actuating means from moving said load applying means from one position to the other.

2. The apparatus claimed in claim 1, including spring means engaging the lowermost ends of said upright arms, said spring means being positioned to normally maintain said arms in vertical position.

3. The apparatus claimed in claim 2, including retractable stop means having an extended position in which said stop means contact the lowermost ends of said upright arms to prevent pivoting movement of said arms in one direction, and a retracted position in which said stop means are free from contact with said arms, and means for moving said stop means from one position to the other.

4. The apparatus claimed in claim 3, including sensor means on said stop means positioned to contact said upright arms when said stop means are in the extended position.

5. The apparatus claimed in claim 4, including sensor means mounted at the lowermost ends of said upright arms.

6. The apparatus claimed in claim 1, wherein said resilient load applying means comprises a helical spring adapted to be loaded by compression in either direction.

7. The apparatus claimed in claim 6 wherein said resilient load applying means comprises a tubular housing, an axially displacable shaft journalled in said housing with one end of said shaft extending outward from one end of said housing, an opposing pair of spaced apart compression flanges slidably journaled on said shaft and seated against stops at the opposite ends of said housing, said helical spring surrounding said shaft and extending between said opposing compression flanges, means operatively connecting the outwardly extending end of said shaft to said upright arms, and means operatively connecting the opposite end of said housing to said actuating means.

8. A method of correcting rubber tires under conditions simulating the weight load of the vehicle as transmitted to the tire through the vehicle's suspension system, comprising the steps of:
    rotating the tire at a predetermined cruising speed,
    dynamically loading the tire by displacing the axis of rotation of the tire in the direction of a road wheel having a fixed axis of rotation,
    causing the periphery of the tire to contact the road wheel under a predetermined resilient load, including the step of utilizing a spring means to generate said resilient load, and
    measuring the magnitude and locations of the forces generated by the rotating tire while under said resilient load, including the step of measuring the said forces by first rotating the tire in one direction and then in the opposite direction.

9. A method for correcting rubber tires comprising the steps of:
    rotating the tire at a predetermined cruising speed,
    statically loading the tire to simulate the dead weight load which will be borne by the tire in use,
    measuring the magnitudes and locations of the forces generated by the rotating tire under static load,
    releasing the static load on the tire and thereafter dynamically loading the tire to simulate the weight load of the vehicle as transmitted to the tire through the vehicle's suspension system,
    measuring the magnitudes and locations of the forces generated by the rotating tire when under dynamic load, and
    correcting the tire in accordance with a composite of the collected data.

10. The method claimed in claim 9, wherein the tire is statically loaded by maintaining the axis of rotation of the tire in a fixed position and applying a static load to the periphery of the tire by means of a road wheel.

11. The method claimed in claim 9, wherein the tire is dynamically loaded by displacing the axis of rotation of the tire in the direction of a road wheel having a fixed axis of rotation, and causing the periphery of the tire to contact the road wheel under a predetermined resilient load.

12. The method claimed in claim 11, including the step of utilizing spring means to cause the periphery of the tire to contact the road wheel under a predetermined resilient load.

13. The method claimed in claim 9, including the step of measuring the tire for dynamic imbalance while rotating the tire free from contact with the road wheel and with the axis of rotation of the tire in spring loaded position.

14. The method claimed in claim 9, including step of measuring the forces generated by the rotating tire while first rotating the tire in one direction and then in the opposite direction, whereby to determine in which direction the tire generates the lowest rolling resistance.

* * * * *